(No Model.)

E. G. HOYT.
Cider Press.

No. 236,592. Patented Jan. 11, 1881.

Witnesses:

Elias G. Hoyt, Inventor
By atty

UNITED STATES PATENT OFFICE.

ELIAS G. HOYT, OF RIDGEFIELD, ASSIGNOR OF ONE-HALF TO PHINEAS C. LOUNSBY, OF SOUTH NORWALK, CONNECTICUT.

CIDER-PRESS.

SPECIFICATION forming part of Letters Patent No. 236,592, dated January 11, 1881.

Application filed November 19, 1880. (No model.)

*To all whom it may concern:*

Be it known that I, ELIAS G. HOYT, of Ridgefield, in the county of Fairfield and State of Connecticut, have invented an Improvement in Cider-Presses; and I do hereby declare the following, when taken in connection with the accompanying drawings and the letters of reference marked thereon, to be a full, clear, and exact description of the same, and which said drawings constitute part of this specification, and represent, in—

Figure 1:
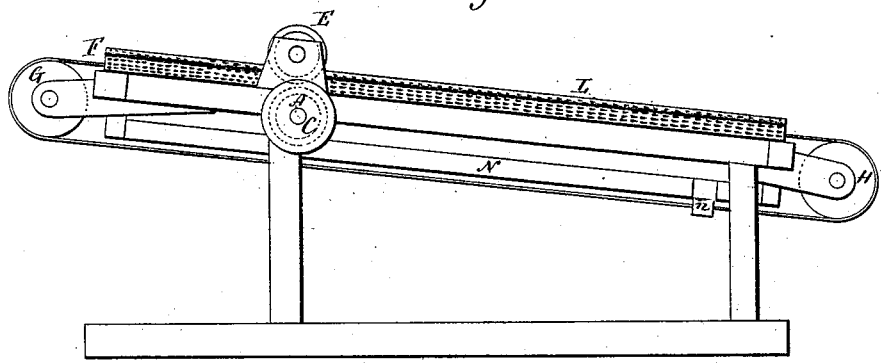
Figure 2:
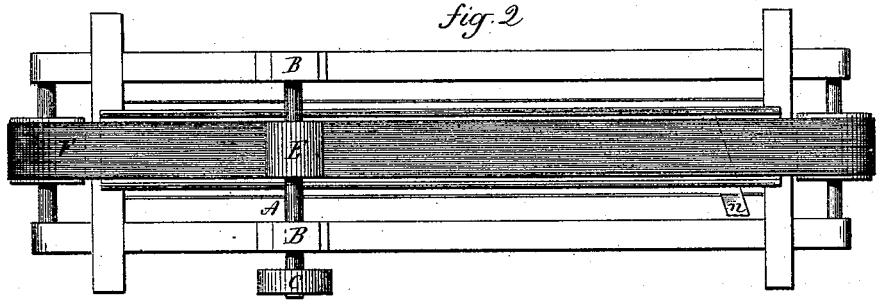
Figure 3:
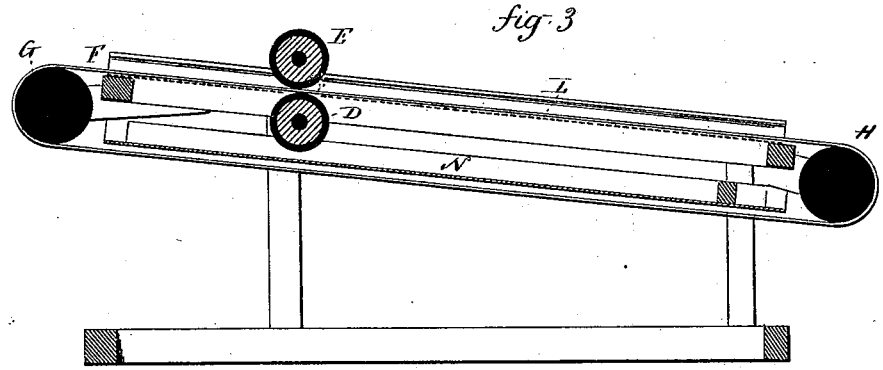
Figure 4:
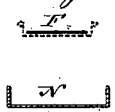

Figure 1, a side view; Fig. 2, top view; Fig. 3, longitudinal section; Fig. 4, transverse section.

This invention relates to an apparatus for pressing the pomace to extract the juice therefrom, especially designed for use in making cider, the object being to dispense with the usual laborious operations of screw-presses, and to avoid the necessary gathering the pomace into a mass for pressing, and to readily separate the juice and deliver the waste; and the invention consists in the construction hereinafter described, and particularly recited in the claim.

A is the driving-shaft, which is arranged to revolve in suitable bearings B by a power applied thereto through a pulley, C, or otherwise. On this shaft is a roll, D, and running above it a corresponding roll, E, the axis of which is substantially parallel to that of the roll D. Between these rolls an endless apron, F, passes over a pulley, G, at one side and pulley H at the other, the two pulleys G H arranged so that the apron is inclined downward from the rolls toward the pulley H. The upper run of the apron passes through a trough, L, which is preferably perforated in its bottom and sides, so as to form a guard at the sides to prevent the material placed on the apron from escaping. Below the lower roll, D, and above the lower run of the apron, is a receiver, N. This receiver is broader than the trough L, as seen in Fig. 4, and is correspondingly inclined, and at its lowest point a conductor, *n*, leads therefrom, as seen in Figs. 1 and 2.

The rolls D E are preferably made with elastic surfaces, as of rubber; but they may be hard rolls with yielding pressure applied thereto. The trough L may terminate at the rolls, but preferably extend beyond them, but with an opening through its bottom, so that the lower roll may bear directly upon the apron, and so that when the rolls are revolving they will impart a movement to the apron—that is, draw the apron along between them from the lower end toward the other.

The pomace is placed upon the apron F into the trough on the lower side, and by the movement of the apron is carried between the rolls, which give to it the required pressure to express the juice, which flows through the perforations in the trough into the receiver N below, the pressed pomace passing with the apron until it reaches the roll G, where it falls or is delivered from the apparatus. The juice expressed flows from the receiver N, through the conductor *n*, into tanks or other provision made to receive it.

This apparatus completely presses the pomace as it passes between the rolls, the quantity being so small that no time or rest is required for it to drain, and much more rapid work can be performed than with the usual screw or similar presses, which require the pomace to stand considerable time to drain. This apparatus is adapted to press a smaller quantity of pomace than could be possibly used in the common screw-press.

The pomace may be delivered directly from the mill onto the apron, so as to make the pressing automatic with the grinding.

Instead of perforating the trough, it may be constructed with grooves which will lead to openings to the receiver below, the object of the perforations or grooves in the trough being to collect the juice which flows from the pomace before it reaches the rolls.

I do not wish to be understood as claiming the arrangement of a pressing apparatus which may be used in direct connection with the grinding-mill, as such, I am aware, is not new; but What I do claim is—

The combination of the pressing-rolls D E, the endless apron passing between said rolls, the trough or guard through which the upper run of the apron passes, and the receiver N below, substantially as and for the purpose described.

ELIAS G. HOYT.

Witnesses:
W. A. WILLIAMS,
HIRAM K. SCOTT.